(12) United States Patent
Choi et al.

(10) Patent No.: US 11,893,987 B2
(45) Date of Patent: Feb. 6, 2024

(54) SERVER AND SYSTEM INCLUDING THE SAME

(71) Applicant: LG ELECTRONICS INC., Seoul (KR)

(72) Inventors: Yookyoung Choi, Seoul (KR); Kiwon Park, Seoul (KR); Jaekyung Lee, Seoul (KR)

(73) Assignee: LG ELECTRONICS, INC., Seoul (KR)

( * ) Notice: Subject to any disclaimer, the term of this patent is extended or adjusted under 35 U.S.C. 154(b) by 244 days.

(21) Appl. No.: 17/334,280

(22) Filed: May 28, 2021

(65) Prior Publication Data
US 2021/0375284 A1    Dec. 2, 2021

(30) Foreign Application Priority Data

Jun. 1, 2020 (KR) .......................... 10-2020-0065613

(51) Int. Cl.
*G10L 15/00* (2013.01)
*G10L 15/22* (2006.01)
(Continued)

(52) U.S. Cl.
CPC .............. *G10L 15/22* (2013.01); *G10L 15/02* (2013.01); *G10L 15/183* (2013.01); *G10L 15/30* (2013.01)

(58) Field of Classification Search
CPC ......... G10L 15/07; G10L 15/20; G10L 15/22; G10L 15/26; G10L 15/30; G10L 15/02;
(Continued)

(56) References Cited

U.S. PATENT DOCUMENTS 9,805,718 B2 * 10/2017 Ayan .................... H04M 3/4936
10,931,724 B2 * 2/2021 Unitt ....................... H04L 67/56
(Continued)

FOREIGN PATENT DOCUMENTS

EP    3486900    5/2019

OTHER PUBLICATIONS

European Patent Office Application Serial No. 21176772.8, Search Report dated Nov. 12, 2021, 10 pages.
(Continued)

*Primary Examiner* — Vu B Hang
(74) *Attorney, Agent, or Firm* — LEE, HONG, DEGERMAN, KANG & WAIMEY

(57) ABSTRACT

The present disclosure relates to a server and a system including the same. The server according to an embodiment of the present disclosure includes: a communicator configured to perform communication through a network; a storage configured to store data on at least one predetermined word; and a controller configured to: upon receiving an input signal, including data on speech, from a first electronic device through the communicator, determine whether a last part of the speech corresponds to any one of the at least one predetermined word; in response to there being a word corresponding to the last part of the speech among the at least one predetermined word, transmit a first response signal, including data on a response to the speech and data on at least one additional query, to the first electronic device through the communicator; and in response to there being no word corresponding to the last part of the speech among the at least one predetermined word, transmit a second response signal, including data on a response to the speech, to the first electronic device through the communicator. Various other embodiments are also possible.

16 Claims, 13 Drawing Sheets

(51) Int. Cl.
  *G10L 15/02* (2006.01)
  *G10L 15/183* (2013.01)
  *G10L 15/30* (2013.01)

(58) Field of Classification Search
  CPC ....... G10L 15/063; G10L 25/78; G10L 25/87;
        G10L 15/08; G10L 15/14; G10L 15/1815;
          G10L 15/197; G10L 15/1822; G10L
         15/183; G10L 15/19; G10L 15/193; G10L
           13/00; G10L 15/16; G10L 25/30; G10L
            25/27; G10L 19/005; G10L 19/00; G10L
                 15/12; G06F 3/16; G06F 40/30
  See application file for complete search history.

(56) References Cited

U.S. PATENT DOCUMENTS

2010/0138224 A1   6/2010  Bedingfield
2019/0378493 A1* 12/2019  Kim .................... G10L 15/05

OTHER PUBLICATIONS

Boyce et al., "User Interface for Natural Spoken Dialog Systems," AT&T Laboratories, May 2000, 4 pages.

* cited by examiner

SERVER AND SYSTEM INCLUDING THE SAME

CROSS-REFERENCE TO RELATED APPLICATION

Pursuant to 35 U.S.C. § 119 (a), this application claims the benefit of an earlier filing date and right of priority to Korean Patent Application No. 10-2020-0065613 filed on Jun. 1, 2020, the contents of which is hereby incorporated by reference herein in its entirety.

BACKGROUND OF THE INVENTION

1. Field of the Disclosure

The present disclosure relates to a server and a system including the same.

2. Description of the Related Art

Home appliances are devices used for user convenience. The home appliances, such as an image display device, an air conditioner, a washing machine, a refrigerator, etc., which are used in specific spaces at home or office, perform their unique functions and operations by a user's manipulation. For example, the image display device, such as a TV, a monitor, or a projector, has the function of displaying images viewed by a user, and the user may view broadcast programs using the image display device. Further, the air conditioner has the function of heating or cooling the indoor air, the refrigerator has the function of keeping foods fresh, the washing machine has the function of washing the clothes, the cleaner has a cleaning function, cooking equipment has the function of cooking foods, and the like.

Generally, a user controls the home appliance by directly manipulating a button provided on a main body of the home appliance or by using a remote control device, such as a remote control and the like, to avoid inconvenience in moving to the main body. However, even when using the remote control device, it is also inconvenient for the user to check and manipulate a manipulation key for each function, and in a dark indoor space, it is difficult for the user to identify the manipulation key, such that a light-emitting device should be further provided for the remote control device or the user is required to manipulate a separate lighting device.

In addition, there is also a problem in that when wishing to control the home appliance, the user may not identify the position of a remote control device or the remote control device may be lost, such that there is no way of remotely controlling the home appliance. In order to solve the problem, research has been actively conducted recently on methods to control the home appliances by using a speech recognition technology.

Generally, when controlling the home appliance by using the speech recognition technology, the user activates a speech command receiving function by voice wake-up and the like, and then utters speech to input a command. In this case, by directly recognizing and processing the input speech, the home appliance may perform an operation according to a command corresponding to the speech, or upon transmitting speech to a server capable of processing speech, the home appliance may perform an operation according to a command corresponding to the speech received from the server.

However, even in the case where the speech recognition technology is used, upon completing a speech input from the user, the home appliance terminates the activated speech command receiving function and merely performs an operation according to a command corresponding to the input speech, such that every time the user wishes to control the home appliance, it is inconvenient for the user to reactivate the speech command receiving function of the home appliance by voice wake-up and the like, to utter a speech command.

SUMMARY

It is an object of the present disclosure to solve the above and other problems.

It is another object of the present disclosure to provide a server and a system including the same, in which the server may automatically reactivate a speech command receiving function of a home appliance according to words included in speech input from a user, and may further receive the user's speech.

In accordance with an aspect of the present disclosure, the above and other objects can be accomplished by providing a server, including: a communicator configured to perform communication through a network; a storage configured to store data on at least one predetermined word; and a controller, wherein upon receiving an input signal, including data on speech, from a first electronic device through the communicator, the controller determines whether a last part of the speech corresponds to any one of the at least one predetermined word; in response to there being a word corresponding to the last part of the speech among the at least one predetermined word, the controller transmits a first response signal, including data on a response to the speech and data on at least one additional query, to the first electronic device through the communicator; and in response to there being no word corresponding to the last part of the speech among the at least one predetermined word, the controller transmits a second response signal, including data on a response to the speech, to the first electronic device through the communicator.

In accordance with another aspect of the present disclosure, the above and other objects can be accomplished by providing a system including at least one electronic device and a server, wherein among the at least one electronic device, a first electronic device: upon receiving speech, transmits an input signal including data on the speech to the server; and upon receiving a response signal responsive to the input signal from the server, outputs speech according to the received response signal, wherein upon receiving the input signal from the first electronic device, the server determines whether a last part of the speech included in the input signal corresponds to any one of at least one predetermined word; in response to there being a word corresponding to the last part of the speech among the at least one predetermined word, the server transmits a first response signal, including data on a response to the speech and data on at least one additional query, to the first electronic device; and in response to there being no word corresponding to the last part of the speech among the at least one predetermined word, the server transmits a second response signal, including data on a response to the speech, to the first electronic device.

According to the present disclosure, the server and the system including the same have the following effects.

According to various embodiments of the present disclosure, after a response to the speech is provided, the speech command receiving function of the home appliance may be reactivated automatically according to words included in speech input from a user, such that the user may control the home appliance in a simple and convenient manner without repetitive operations, such as voice wake-up and the like.

Furthermore, according to various embodiments of the present disclosure, not only the speech command receiving function of the home appliance 100 may be reactivated automatically, but also an additional query on the response may be provided for a user, thereby naturally inducing the user to make an additional utterance.

In addition, according to various embodiments of the present disclosure, an additional query, regarding an operation expected to be performed following a response, may be generated based on the operation history of the home appliances, thereby providing a user with an additional query which is further relevant to a user's intention, usage pattern, surrounding environment, and the like.

The additional range of applicability of the present disclosure will become apparent from the following detailed description. However, because various changes and modifications will be clearly understood by those skilled in the art within the spirit and scope of the present disclosure, it should be understood that the detailed description and specific embodiments such as preferred embodiments of the present disclosure are merely given by way of example.

DETAILED DESCRIPTION OF THE PREFERRED EMBODIMENTS

Figure 1:
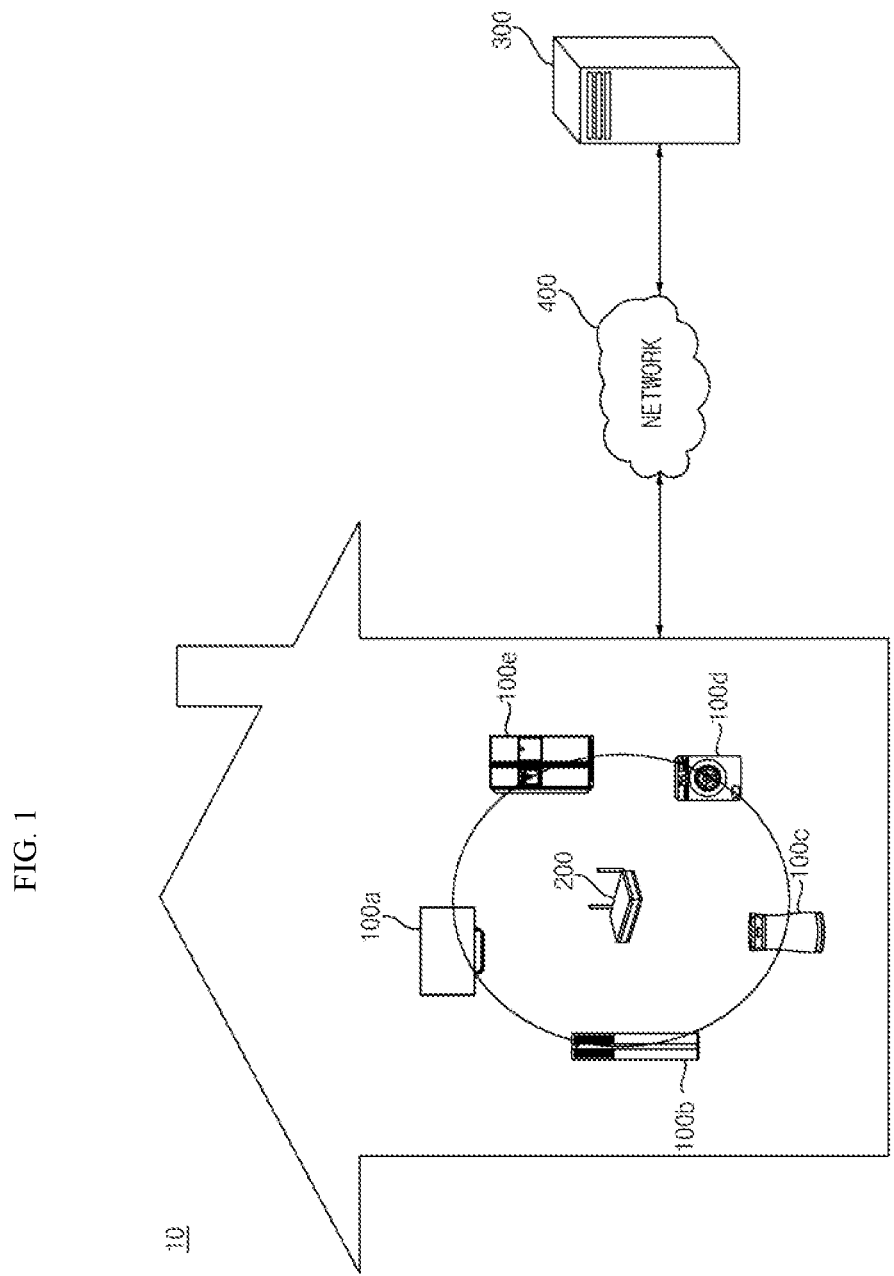
FIG. 1 is a diagram illustrating a system according to various embodiments of the present disclosure.

Reference will now be made in detail to the embodiments of the present disclosure, examples of which are illustrated in the accompanying drawings. To clearly and briefly describe the present disclosure, a part irrelevant to the description will be omitted in the drawings, and the same or like reference numerals in the specification denote the same elements.

The suffixes "module" and "unit" of elements herein are used for convenience of description and do not have any distinguishable meanings or functions. Thus, the "module" and the "unit" may be used interchangeably.

It should be understood that the terms "comprise", "include", "have", etc. when used in this specification, specify the presence of stated features, integers, steps, operations, elements, components, or combinations of them but do not preclude the presence or addition of one or more other features, integers, steps, operations, elements, components, or combinations thereof.

It will be understood that, although the terms "first", "second", etc. may be used herein to describe various elements, these elements should not be limited by these terms. These terms are only used to distinguish one element from another element.

FIG. 1 is a diagram illustrating a system according to various embodiments of the present disclosure.

Referring to FIG. 1, a system 10 includes at least one home appliance 100 and a server 300. The system 10 may include a relay device, i.e., an access point (AP).

According to various embodiments of the present disclosure, the home appliance, electronic device, electronic equipment, and the like may be used interchangeably. While FIG. 1 illustrates an image display device 100a, an air conditioner 100b, an air purifier 100c, a washing machine 100d, and a refrigerator 100e as examples of the home appliance 100, the present disclosure is not limited thereto.

The AP 200 may be a network assisted device which allows devices, communicating with the home appliance 100 and accessing a local network provided by the AP 200, to mutually transmit and receive data or to access a network 300 such as the Internet.

The home appliance 100 may communicate with the server 300 via a network 400 provided by the AP 200, and may transmit and receive signals, including data, with the server 300. The server 300 may process data received from the home appliance 100.

The home appliances 100 may mutually transmit and receive data via the local network provided by the AP 20. The home appliances 100 may mutually transmit and receive data through short-range wireless communication, such as Wireless Fidelity (Wi-Fi), Bluetooth, Bluetooth Low Energy (BLE), ZigBee, Near Field Communication (NFC), and the like.

Figure 2:
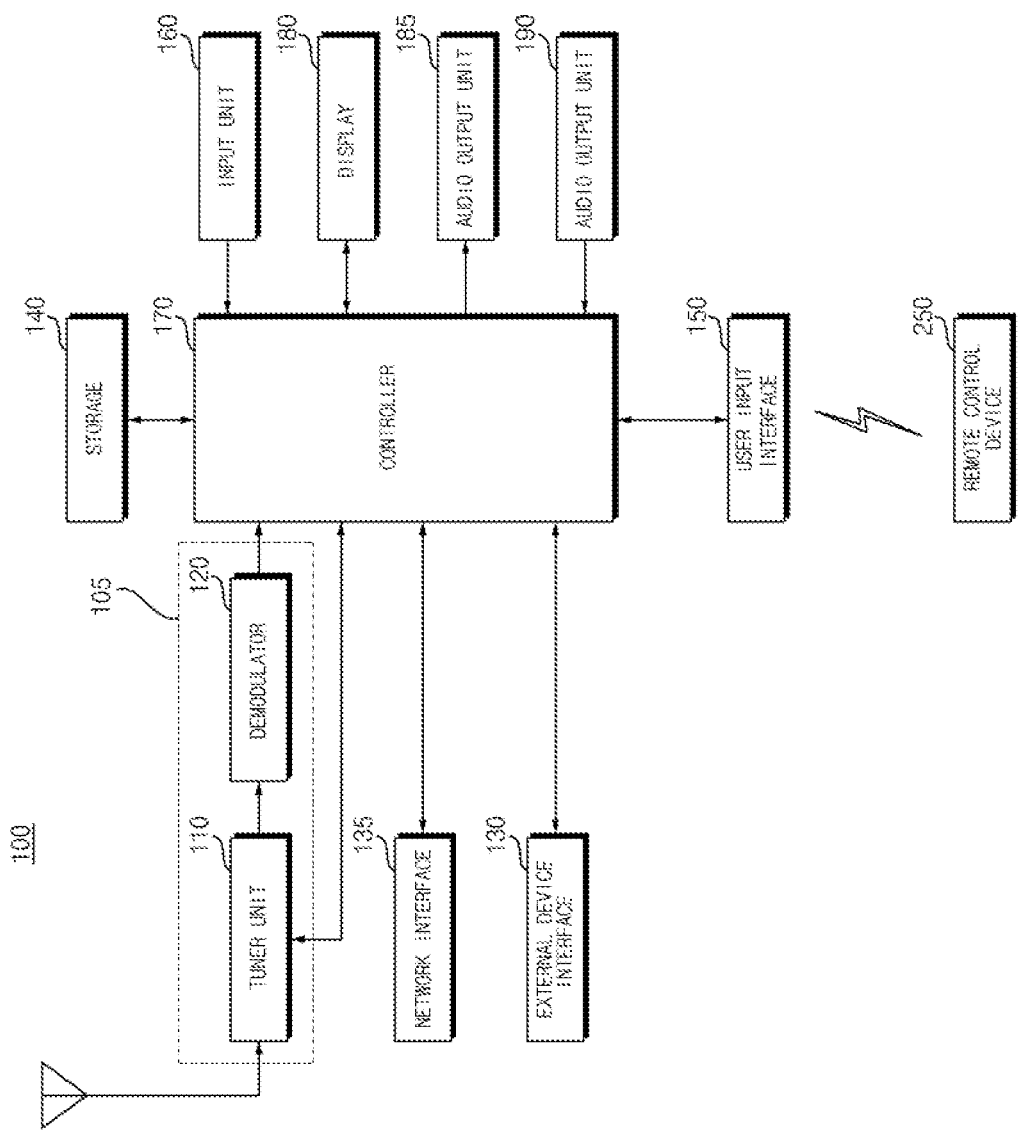
FIG. 2 is an example of an internal block diagram illustrating an image display device of FIG. 1.

FIG. 2 is an internal block diagram illustrating an image display device as an example of the home appliance of FIG. 1. The home appliance 100 according to various embodiments of the present disclosure may include all or part of the components illustrated in FIG. 2, and may further include components according to each of unique functions and operations of the home appliance 100.

Referring to FIG. 2, the image display apparatus 100a as an example of the home appliance 100 may include a broadcast receiver 105, an external device interface 130, a network interface 135, a storage 140, a user input interface 150, an input unit 160, a controller 170, a display 180, an audio output unit 185, and/or a power supply unit 190.

The broadcast receiver 105 may include a tuner 110 and a demodulator 120.

The tuner 110 may select a broadcast signal corresponding to a channel selected by a user or broadcast signals corresponding to all prestored channels from among broadcast signals received through an antenna (not shown) or a cable (not shown). The tuner 110 may convert a selected broadcast signal into an intermediate frequency (IF) signal or a baseband video or audio signal.

For example, if the selected broadcast signal is a digital broadcast signal, the tuner 110 may convert the selected broadcast signal into a digital IF signal (DIF), and if the selected broadcast signal is an analog broadcast signal, the tuner 100 may convert the selected broadcast signal into an analog baseband video or audio signal CVBS/SIF. That is, the tuner 110 may process digital broadcast signals or analog broadcast signals. The analog baseband video or audio signal CVBS/SIF output from the tuner 110 may be directly input to the controller 170.

In addition, the tuner 110 may sequentially select broadcast signals of all the broadcast channels stored through a channel memory function from among the received broadcast signals and may convert the selected broadcast signals into IF signals or baseband video or audio signals.

Further, the tuner 110 may include a plurality of tuners for receiving broadcast signals of a plurality of channels. Alternatively, the tuner 110 may be a single tuner that simultaneously receives broadcast signals of a plurality of channels.

The demodulator 120 may receive a digital IF signal DIF converted by the tuner 110 and may demodulate the digital IF signal.

Upon performing demodulation and channel decoding, the demodulator 120 may output a stream signal TS. In this case, the stream signal may be a multiplexed video signal, audio signal or data signal.

The stream signal output from the demodulator 120 may be input to the controller 170. Upon performing demultiplexing, video/audio signal processing, etc., the controller 170 may output an image to the display 180 and may output sound to the audio output unit 185.

The external device interface 130 may transmit or receive data to or from a connected external device. To this end, the external device interface 130 may include an A/V input/output unit (not shown).

The external device interface 130 may be connected by wire or wirelessly to external devices, such as a digital versatile disc (DVD) player, a Blu-ray player, a game console, a camera, a camcorder, a computer (laptop), a set-top box, etc., and may perform input/output operations for external devices.

The A/V input/output unit may receive video and audio signals of an external device. For example, the A/V input/output unit may include an Ethernet terminal, a USB terminal, a composite video banking sync (CVBS) terminal, a component terminal, a S-video terminal (analog), a digital visual interface (DVI) terminal, a high definition multimedia interface (HDMI) terminal, a mobile high-definition link (MHL) terminal, an RGB terminal, a D-SUB terminal, an IEEE 1394 terminal, an SPDIF terminal, a liquid HD terminal, and the like. A digital signal input through such terminals may be transmitted to the controller 170. In this case, an analogue signal input through the CVBS terminal and the S-video terminal may be converted into a digital signal by an analogue/digital conversion unit (not shown), to be transmitted to the controller 170.

The external device interface 130 may include a wireless communicator (not shown) for short-range wireless communication with other electronic devices. Through the wireless communicator, the external device interface 130 may exchange data with an adjacent mobile terminal. For example, the external device interface 130 may receive, from the mobile terminal, device information, running application information, application images, and the like in a mirroring mode.

The external device interface 130 may perform short-range wireless communication by using Bluetooth, Radio Frequency Identification (RFID) communication, infrared Data Association (IrDA) communication, Ultra-Wideband (UWB), ZigBee, and the like.

The network interface 135 may provide an interface for connecting the home appliance 100 to a wired/wireless network including an Internet network.

The network interface 135 may include a communication module (not shown) for communication with the wired/wireless network 400. For example, the network interface 135 may include a communication module for Wireless LAN (WLAN; Wi-Fi), Wireless broadband (Wibro), World Interoperability for Microwave Access (Wimax), High Speed Downlink Packet Access (HSDPA), and the like.

The network interface 135 may transmit or receive data to or from other users or other electronic devices through a connected network or another network linked to the connected network.

The network interface 135 may receive web content or data provided by a content provider or a network operator. That is, the network interface 135 may receive the web content or data, such as movies, advertisements, games, VOD, broadcast signals, etc., as well as information related thereto, which are provided by content providers or network providers through the network.

The network interface 135 may receive update information and an update file of firmware provided by network operators, and may transmit data to internet or content providers or network operators.

The network interface 135 may select a desired application from among a plurality of applications open to the public, and may receive the selected application through a network.

The storage 140 may store programs for processing and controlling each signal within the controller 180, and may store signal-processed video, audio or data signals. For example, the storage 140 may store applications designed to perform various operations which may be processed by the controller 170, and in response to a request from the controller 170, the storage 140 may selectively provide some of the stored applications.

The programs and the like stored in the storage 140 are not particularly limited, as long as the programs may be executed by the controller 170.

The storage 140 may perform the function of temporarily storing video, audio or data signals received from an external device through the external device interface 130.

The storage 140 may store information on predetermined broadcast channels through a channel memory function.

While FIG. 2 illustrates an example in which the storage 140 is provided separately from the controller 170, the scope of the present disclosure is not limited thereto, and the storage 140 may be included in the controller 170.

The storage 140 may include at least one of a volatile memory (e.g., DRAM, SRAM, SDRAM, etc.) and a non-volatile memory (e.g., flash memory, hard disk type memory (HDD), solid-state drive (SSD), etc.). In various embodiments of the present disclosure, the storage 140 and the memory may be used interchangeably.

The user input interface 150 may transmit a signal, input by a user, to the controller 170 or may transmit a signal, input from the controller 170, to the user. For example, the user input interface 150 may transmit/receive a user input signal, such as power on/off, channel selection, screen setup, etc., to/from a remote control device 250, and may deliver a user input signal input through a local key (not shown), such as a power key, a channel key, a volume key, or a setup value, to the controller 170, or may deliver a user input signal, input from a sensor unit (not shown), which senses a user's gesture, to the controller 170, or may transmit a signal from the controller 170 to the sensor unit.

The input unit 160 may be provided on one side of a main body of the home appliance 100. For example, the input unit 160 may include a touchpad, a physical button, and the like.

The input unit 160 may receive various user commands associated with the operation of the image display device 100a, and may transmit a control signal corresponding to the input command to the controller 170.

The input unit 160 may include at least one microphone (not shown), and may receive a user's speech through the microphone.

The controller 170 may include at least one processor, and by using the included processor, the controller 170 may control the overall operation of the image display device 100a. Here, the processor may be a general processor such as a central processing unit (CPU). It is also possible that the processor is a dedicated device, such as an ASIC, or other hardware-based processor.

The controller 170 may demultiplex a stream input through the tuner 110, the demodulator 120, the external device interface 130, or the network interface 135, or may process demultiplexed signals to generate and output signals for video or audio output.

The display 180 may convert a video signal, a data signal, an OSD signal, and a control signal processed by the controller 170 or a video signal, a data signal and a control signal received from the external device interface 130 to generate driving signals.

The display 180 may include a display panel (not shown) including a plurality of pixels.

The plurality of pixels included in the display panel may have RGB sub-pixels. Alternatively, the plurality of pixels included in the display panel may have RGBW sub-pixels. The display 180 may convert the video signal, data signal, OSD signal, and control signal processed by the controller 170 to generate signals for driving the plurality of pixels.

The display 180 may be a Plasma Display Panel (PDP), a Liquid Crystal Display (LCD), an Organic Light Emitting Diode (OLED), a flexible display, or the like, and may also be a three-dimensional (3D) display. The 3D display 180 may be divided into an autostereoscopic display and a glasses-type display.

Further, the display 180 may be configured as a touch-screen to be used as an input device in addition to an output device.

The audio output unit 185 receives an audio signal processed by the controller 170, and outputs the audio signal as a sound.

The image signal, processed by the controller 170, may be input to the display 180 to be displayed as an image corresponding thereto. Further, The image signal processed by the controller 170 may be input to an external output device through the external device interface 130.

The audio signal processed by the controller 170 may be output as a sound to the audio output unit 185. Further, the audio signal processed by the controller 170 may be input to an external output device through the external device interface 130.

Although not illustrated in FIG. 2, the controller 170 may include a demultiplexer, a video processor, a frame rate converter, a formatter, an audio processor, a data processor, and the like.

Besides, the controller 170 may control the overall operation of the home appliance 100. For example, the controller 170 may control the tuner 110 to tune in to a broadcast channel selected by a user or a prestored channel.

In addition, the controller 170 may control the image display device 100a according to a user command input through the user input interface 150 or an internal program.

Further, the controller 170 may control the display 180 to display images. Here, the images displayed on the display 180 may be still images or moving images and may be 2D images or 3D images.

Moreover, the controller 170 may control a predetermined 2D object to be displayed in an image displayed on the display 180. For example, the object may be at least one of an accessed web screen (newspaper, magazine, etc.), an electronic program guide (EPG), various menus, a widget, an icon, a still image, a moving image, and text.

In addition, the image display device 100a may further include an image capturing unit (not shown). The image capturing unit may capture images of a user. The image capturing unit may be implemented with one camera, but is not limited thereto, and may be implemented with a plurality of cameras. Further, the image capturing unit may be embedded in the home appliance 100 on the top of the display 180, or may be provided separately. Image information captured by the image capturing unit may be input to the controller 170.

The controller 170 may recognize a user's position based on the images captured by the image capturing unit. For example, the controller 170 may identify a distance (z-axis coordinates) between the user and the image display device 100a. In addition, the controller 170 may identify x-axis coordinates and y-axis coordinates corresponding to a user's position in the display 180.

The controller 170 may sense a user's gesture based on the images captured by the image capturing unit or the respective signals sensed by the sensor unit, or a combination thereof.

The power supply unit 190 may supply power throughout the image display device 100a. Particularly, the power supply unit 190 may supply power to the controller 170 implemented in the form of a system on chip (SOC), the display 180 for image display, the audio output unit 185 for audio output, and the like.

Specifically, the power supply unit 190 may include a converter for converting AC power into DC power and a DC/DC converter (not shown) for changing a DC power level.

The remote control device 250 transmits a user input to the user input interface 150. To this end, the remote controller 250 may use Bluetooth, radio frequency (RF) communication, infrared (IR) communication, Ultra Wideband (UWB), ZigBee and the like. Furthermore, the remote control device 200 may receive video, audio or data signals output from the user input interface 150, and may display the received signals or may output the same as sound through the remote control device 200.

In addition, the aforementioned image display device 100a may be a fixed type or movable digital broadcast receiver capable of receiving digital broadcast.

The block diagram of the image display device 100a illustrated in FIG. 2 is merely a block diagram for an embodiment of the present disclosure. Components of the block diagram may be integrated, added or omitted according to specifications of the image display device 100a implemented in practice.

That is, two or more components may be combined or one component may be divided into two or more components as needed. Furthermore, a function executed in each block is for description of an embodiment of the present disclosure, and a specific operation or device of each block is not intended to limit the scope of the present disclosure.

Figure 3:
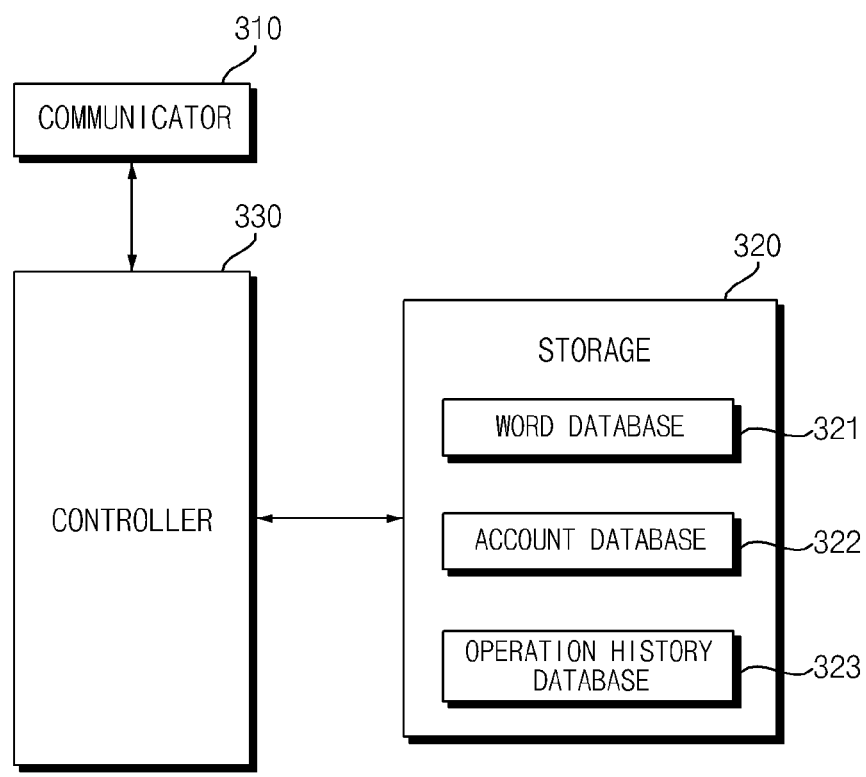
FIG. 3 is an example of an internal block diagram illustrating a server of FIG. 1.

FIG. 3 is an example of an internal block diagram illustrating the server of FIG. 1.

Referring to FIG. 3, the server 300 may include a communicator 310, a storage 320, and/or a controller 330.

The communicator 310 may include at least one communication module for connection with a wired/wireless network 300, and may access the network 400 to communicate with the home appliance 100.

The storage 320 may store programs for processing and controlling each signal within the controller 330, and may store processed data signals. For example, the storage 320 may store applications designed to perform various operations which may be processed by the controller 170, and in response to a request from the controller 170, the storage 140 may selectively provide some of the stored applications. The programs stored in the storage 320 are not particularly limited, as long as the programs may be executed by the controller 330.

While FIG. 3 illustrates an example in which the storage 320 is provided separately from the controller 330, the scope of the present disclosure is not limited thereto, and the storage 140 may be included in the controller 170.

The storage 320 may include at least one of a volatile memory (e.g., DRAM, SRAM, SDRAM, etc.) and a non-volatile memory (e.g., flash memory, hard disk type memory (HDD), solid-state drive (SSD), etc.).

In addition, the storage 320 may include at least one database.

The storage 320 may include a word database 321 including data on various words used for speech recognition.

The storage 320 may include an account database 322 including data on an account of at least one user. For example, the data on a user's account may include a user account identifier, a device identifier of at least one home appliance 100 registered to an account, a serial number, a MAC Address, and the like.

The storage 320 may include an operation history database 323 including data on an operation history of at least one home appliance 100. For example, the data on the operation history may include a surrounding environment (e.g., temperature, humidity, etc.) or an operation history of the home appliance 100 over time.

The storage 320 may store data, models, algorithms, etc., which are pre-learned by machine learning such as deep learning and the like.

The controller 330 may be connected to each component of the server 300, and may control the overall operation of each component. The controller 330 may transmit and receive data with each component of the server 300.

The controller 330 may transmit and receive signals including data with the home appliance 100 through the communicator 310.

The controller 330 may perform speech recognition of speech included in a signal received from the home appliance 100. For example, the controller 330 may perform speech recognition by using natural language processing (NLP), and may extract words included in the speech. Here, natural language processing (NLP) may refer to technology that mechanically analyzes human languages and makes it into a form that can be understood by electronic devices.

Based on a speech recognition result, the controller 330 may extract a command included in the speech and may generate a response to the command and/or an additional query. In this case, the controller 330 may generate a response to the command and/or an additional query based on at least one database included in the storage 320.

The controller 330 may transmit a signal, including data on the response and/or the additional query, a control command, etc., to the home appliance 100.

Further, although not illustrated herein, the server 300 may be composed of at least one sub-server. For example, the server 300 may include a speech recognition server configured to receive a signal, including data on speech, from the home appliance 100 and to perform speech recognition of the speech to extract words included in the speech, a response generation server configured to generate a response to the speech and/or an additional query, a control server configured to transmit a signal, including data on the response and/or the additional query, a control command, etc., to the home appliance 100, and the like.

Figure 4:
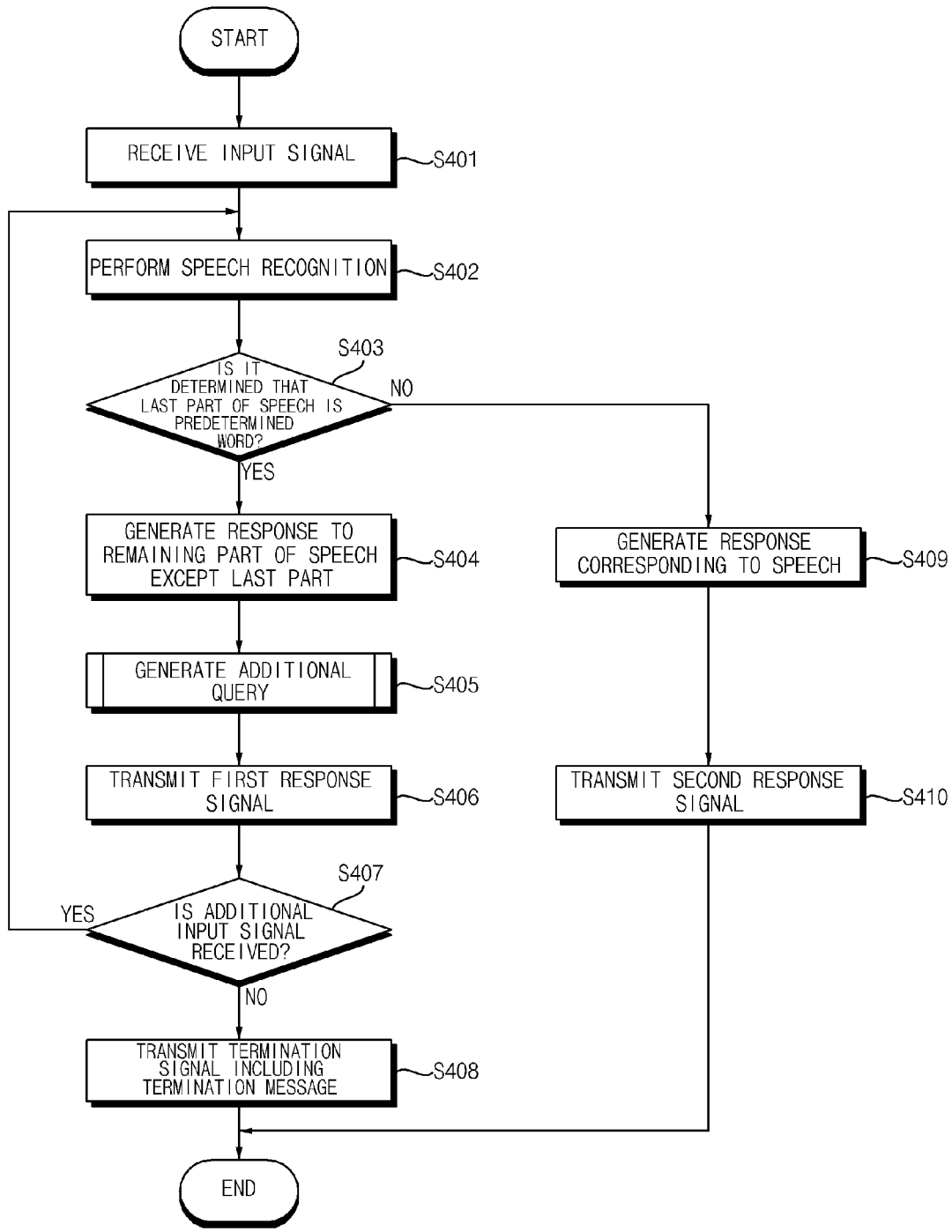
FIGS. 4 and 5 are flowcharts illustrating an operating method of a server according to an embodiment of the present disclosure.
Figure 5:
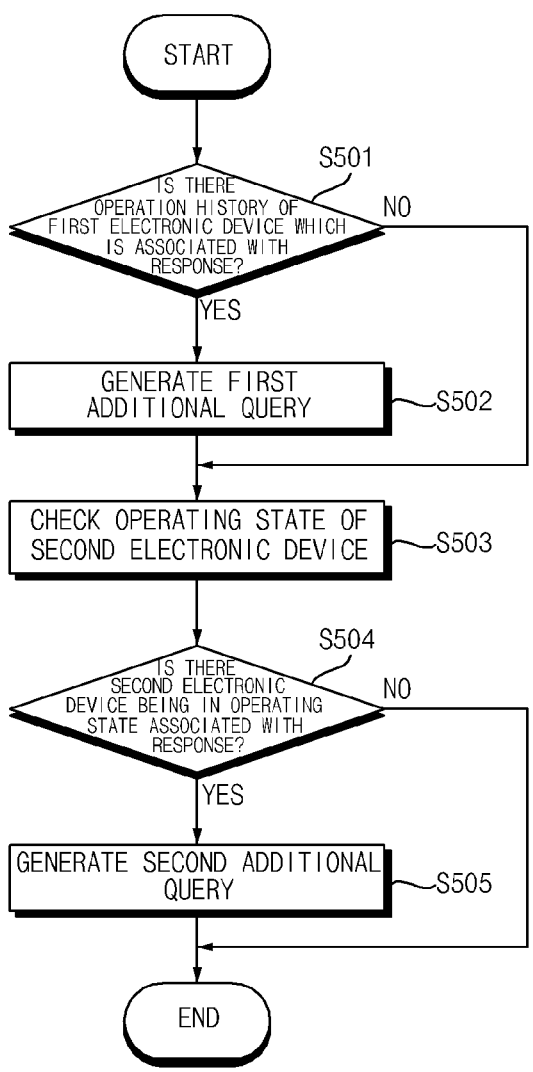

FIGS. 4 and 5 are flowcharts illustrating an operating method of a server according to an embodiment of the present disclosure.

Referring to FIG. 4, the server 300 may receive a signal including data on speech (hereinafter referred to as an input signal) from the home appliance 100 in operation S401.

In operation S402, the server 300 may perform speech recognition of the speech included in the input signal. For example, the server 300 may extract words included in the speech by using NLP.

In operation S403, the server 300 may determine whether a word corresponding to the last part of the speech is a predetermined word. Here, the predetermined word may include a conjunction (e.g., and, so, but, or, yet, etc.) that joins together preceding and following words, phrases, or clauses, a meaningless word (e.g., filler word) present in the middle of a sentence or in a last portion of a sentence, etc., and a predetermined command (e.g., wait, repeat, etc.).

For example, if speech included in the input signal received from the home appliance 100 is "what is the current temperature? and," the server 300 may extract words, "current," "temperature," "what," and "and," and may determine whether the word "and" corresponding to the last part of the speech is a predetermined word.

If the word corresponding to the last part of the speech is the predetermined word, the server 300 may generate a response to the remaining part of the speech, except the last part, in operation S404. For example, in the speech "what is the current temperature? and" included in the input signal, the server 300 may generate a response to the current temperature in response to the remaining part, i.e., "what is the current temperature?," except "and" corresponding to the last part of the speech.

If a word corresponding to the last part of the speech is the predetermined word, the server 300 may generate an additional query in operation S405. In this case, based on at least one database included in the storage 320, the server 300 may generate an additional query regarding the generated response to the speech, which will be described below with reference to FIG. 5.

Referring to FIG. 5, based on the operation history database 323, the server 300 may verify whether there is at least one operation history associated with the response in operation S501, among operation histories of a first electronic device 100a, to which the input signal is transmitted, in the home appliance 100.

For example, if the generated response to the speech is a response to the current temperature, the server 300 may verify whether there is an operation history of the first electronic device 100a which is associated with: an operation of the first electronic device 100a performed at a temperature corresponding to the current temperature; an operation performed by the first electronic device 100a after the response to the current temperature is transmitted to the first electronic device 100a; the content of additional speech received from the first electronic device 100a after the response to the current temperature is transmitted to the first electronic device 100a; an operation performed by the first electronic device 100a after the response to the additional speech is transmitted to the first electronic device 100a; and the like.

If there is at least one operation history of the first electronic device 100a associated with the generated response to the speech, the server 300 may generate an additional query (hereinafter referred to as a first additional query) about the first electronic device 100a in operation S502 based on the operation history of the first electronic device 100a.

In operation S503, the server 300 may check an operating state of at least one second electronic device 100b, except the first electronic device 100a to which the input signal is transmitted, in the home appliance 100. Here, the second electronic device 100b may be a home appliance 100 registered to a user's account, to which the first electronic device 100a is registered.

Further, the at least one second electronic device 100b may transmit a signal, including data on the operating state, to the server 300 at predetermined intervals and/or in response to a transmission request of the server 300.

In operation S504, the server 300 may verify whether there is at least one second electronic device 100b, which is in an operating state associated with the response, in the at least one second electronic device 100b. For example, if the generated response to the speech is the response to the current temperature, the server 300 may verify whether there is at least one second electronic device 100b, which is in an operating state associated with the response, based on the operation history regarding: an operation of the second electronic device 100b performed at a temperature corresponding to the current temperature; an operation performed by the second electronic device 100b after the response to the current temperature is transmitted to the second electronic device 100b; the content of additional speech received from the second electronic device 100b after the response to the current temperature is transmitted to the second electronic device 100b; an operation performed by the second electronic device 100b after the response to the additional speech is transmitted to the second electronic device 100b; and the like.

If there is at least one second electronic device 100b which is in an operating state associated with the generated response to the speech, the server 300 may generate an additional query (hereinafter referred to as a second additional query) about the second electronic device 100b in operation S505 based on the operation history of the second electronic device 100b.

Although not illustrated herein, the server 300 may generate an additional query about the response based on data pre-learned by machine learning such as deep learning and the like.

Referring back to FIG. 4, the server 300 may transmit a response signal (hereinafter referred to as a first response signal), including the data on the response generated in operation S404 and the data on the at least one additional query generated in operation S405, to the home appliance 100 in operation S406. In this case, the first response signal may further include a control command for activating a speech command receiving function of the home appliance 100. The home appliance 100 receiving the first response signal may turn on a microphone included in the input unit 160, and may wait for a speech input from a user.

If the first and second additional queries are not generated in operation S405, the server 300 may include data on a predetermined additional query in the first response signal. Here, the predetermined additional query may include a query, e.g., "do you need any more information?" and the like, to induce a user to give additional speech.

Further, the server 300 may further include a control command for controlling a word, corresponding to the last part of the speech, to be output between an output of the response to the speech and an output of at least one additional query. As described above, when the home appliance 100 outputs the word, corresponding to the last part of the speech uttered by a user, while including the word in the response, the home appliance 100 may promote a user's sense of closeness for the home appliance 100 and a speech recognition technology.

In operation S407, the server 300 may verify whether an input signal is further received from the home appliance 100 within a predetermined period of time after the server 300 transmits the first response signal to the home appliance 100.

In this case, if the input signal is received from the home appliance 100 within the predetermined period of time after the first response signal is transmitted, the server 300 may return to operation S402 to perform speech recognition of speech included in the additionally received input signal.

If the input signal is not received from the home appliance 100 within the predetermined period of time after the first response signal is transmitted, the server 300 may transmit a termination signal including a predetermined termination message to the home appliance 100 in operation S408. Here, the termination message may be a message notifying a user of termination of the activated speech command receiving function.

Further, if a word corresponding to the last part of the speech is not the predetermined word, the server 300 may generate a response corresponding to the entire part of the speech in operation S409.

In addition, the server 300 may transmit a response signal (hereinafter referred to as a second response signal) including data on the response generated in S409 to the home appliance 100 in operation S410. In this case, unlike the first response signal, the second response signal includes no control command for activating the speech command receiving function of the home appliance 100, such that the home appliance 100 receiving the second response signal may output only a response included in the second response signal.

Figure 6:
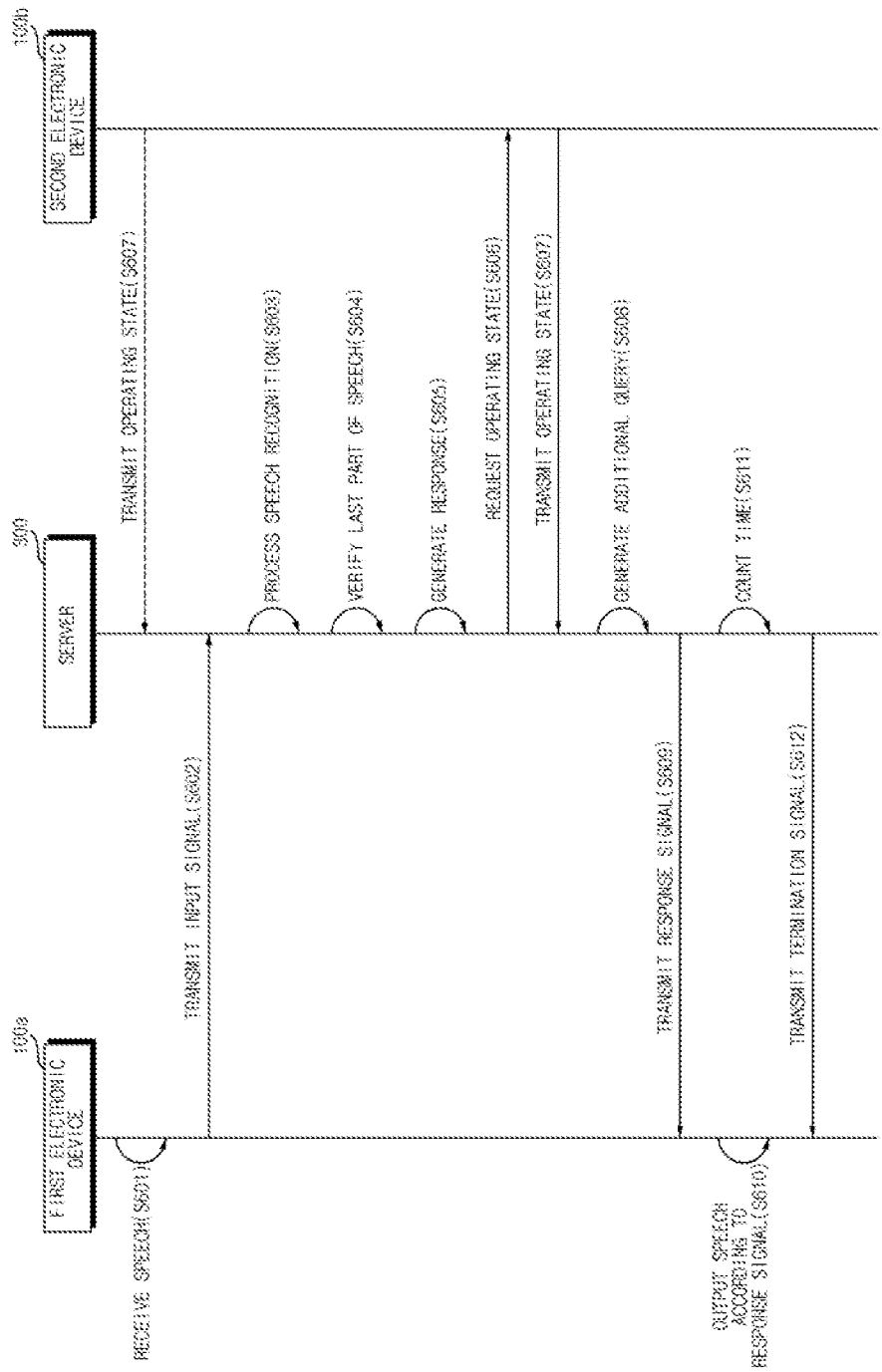
FIG. 6 is a flowchart illustrating an operating method of a system according to an embodiment of the present disclosure.

FIG. 6 is a flowchart illustrating an operating method of a system according to an embodiment of the present disclosure. Detailed description of portions overlapping those described above with reference to FIGS. 4 and 5 will be omitted.

Referring to FIG. 6, the first electronic device 100a may receive a user's speech in operation S601. For example, upon receiving speech including a predetermined wake-up word through a microphone of the input unit 160, the first electronic device 100a may activate the speech command receiving function, and may receive the speech, received while the speech command receiving function is activated, as a speech command.

In this case, the first electronic device 100a may be maintained in a standby state in which the first electronic device 100a neglects a speech input except the predetermined wake-up word.

Further, the first electronic device 100a may wait for the input of a speech command for a predetermined period of time after receiving the predetermined wake-up word, or may receive continuous speech including the predetermined wake-up word and the speech command.

In operation S602, the first electronic device 100a may transmit an input signal, including data on the speech, to the server 300. In this case, the data on the speech may include only a speech command which is input after a predetermined wake-up word is received, or may include both the predetermined wake-up word and the speech command.

In operation S603, the server may perform speech recognition of the speech included in the input signal. For example, the server 300 may extract words included in the speech by using NLP.

In operation S604, by verifying the last part of the speech, the server 300 may determine whether a word corresponding to the last part of the speech is a predetermined word.

In operation S605, the server 300 may generate a response to the speech. For example, if the word corresponding to the last part of the speech is the predetermined word, the server 300 may generate a response corresponding to a remaining part of the speech except the last part. The following description of FIG. 6 will be given using an example in which the word corresponding to the last word of the speech is the predetermined word.

In operation S606, the server 300 may transmit a request for transmitting an operating state to at least one second electronic device 100b, except the first electronic device 100a to which the input signal is transmitted, among the home appliances 100. In operation S607, in response to the request from the server 300, the at least one second electronic device 100b may transmit a signal including data on the operating state to the server 300.

Further, as illustrated herein, even when not receiving the request from the server 300, the at least one second electronic device 100b may transmits the signal, including the data on the operating state, to the server 300 at predetermined intervals and/or in response to the occurrence of a predetermined event.

In operation S608, the server 300 may generate an additional query about the generated response to the speech based on an operation history of the first electronic device 100a and/or an operation history of the second electronic device 100b.

In operation S609, the server 300 may transmit a first response signal, including data on the response to the speech and data on the additional query, to the first electronic device 100a. In this case, if the word corresponding to the last part of the speech is the predetermined word, the server 300 may include a control command for activating a speech command receiving function in the first response signal.

In operation S610, upon receiving the first response signal from the server 300, the first electronic device 100a may output the response and the additional query which are included in the first response signal. For example, the first electronic device 100a may sequentially output speech corresponding to the response and speech corresponding to the additional query through the audio output unit 185. In this case, the first electronic device 100a may output the word, corresponding to the last part of the speech received in operation S601, between the output of the speech corresponding to the response and the output of the speech corresponding to the additional query.

In addition, according to the control command for activating the speech command receiving function included in the first response signal, the first electronic device 100a may activate the speech command receiving function even when there is no input of the predetermined wake-up word, and may receive the speech command included in speech uttered by a user.

Further, in operation S611, when the first response signal is transmitted, the server 300 may count an elapsed time after the first response signal is transmitted.

In operation S612, if the input signal is not transmitted from the home appliance 100 until a predetermined time has elapsed after transmission of the first response signal, the server 300 may transmit a termination signal, including a predetermined termination message, to the home appliance 100.

In this case, the first electronic device 100a receiving the termination signal may output speech, corresponding to the predetermined termination message included in the termination signal, through the audio output unit 185, and may terminate the speech command receiving function.

FIGS. 7A to 9B are diagrams referred to in explaining various embodiments of the present disclosure.

Figure 7A:
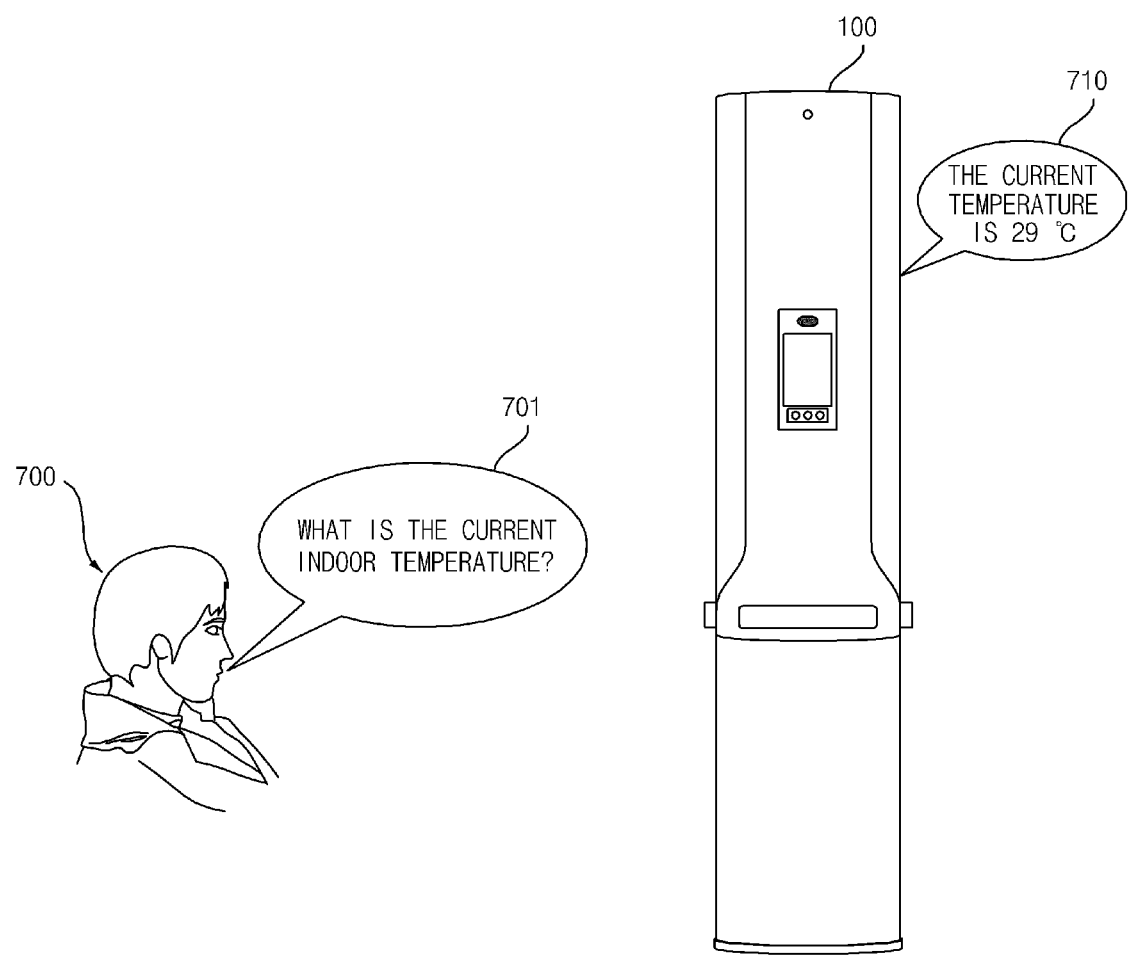
FIGS. 7A to 9B are diagrams referred to in explaining various embodiments of the present disclosure.

Referring to FIG. 7A, a user 700 may utter speech 701, including "Hi, LG" which is a predetermined wake-up word and "what is the current indoor temperature?" corresponding to a speech command, toward an air conditioner as an example of the home appliance 100.

In this case, the home appliance 100 may activate the speech command receiving function in response to the predetermined wake-up word, "Hi, LG," and may transmit data corresponding to the speech command, "what is the current indoor temperature?", to the server 300.

In addition, in the speech corresponding to the speech command uttered by the user, "what is the current indoor temperature?", a word corresponding to the last part of the speech is not a predetermined word, such that the server 300 may transmit a response signal including a response to the speech, "what is the current indoor temperature?", to the home appliance 100.

Further, the home appliance 100 may output speech 710, corresponding to the response to the current temperature included in the response signal received from the server 300, through the audio output unit 185. In this case, the word corresponding to the last part of the speech, "what is the current indoor temperature?", is not the predetermined word, such that the response signal received from the server 300 does not include the control command for activating the speech command receiving function. Accordingly, upon outputting only the speech 710 corresponding to the response to the current temperature, the home appliance 100 may be maintained in a standby state.

Figure 7B:
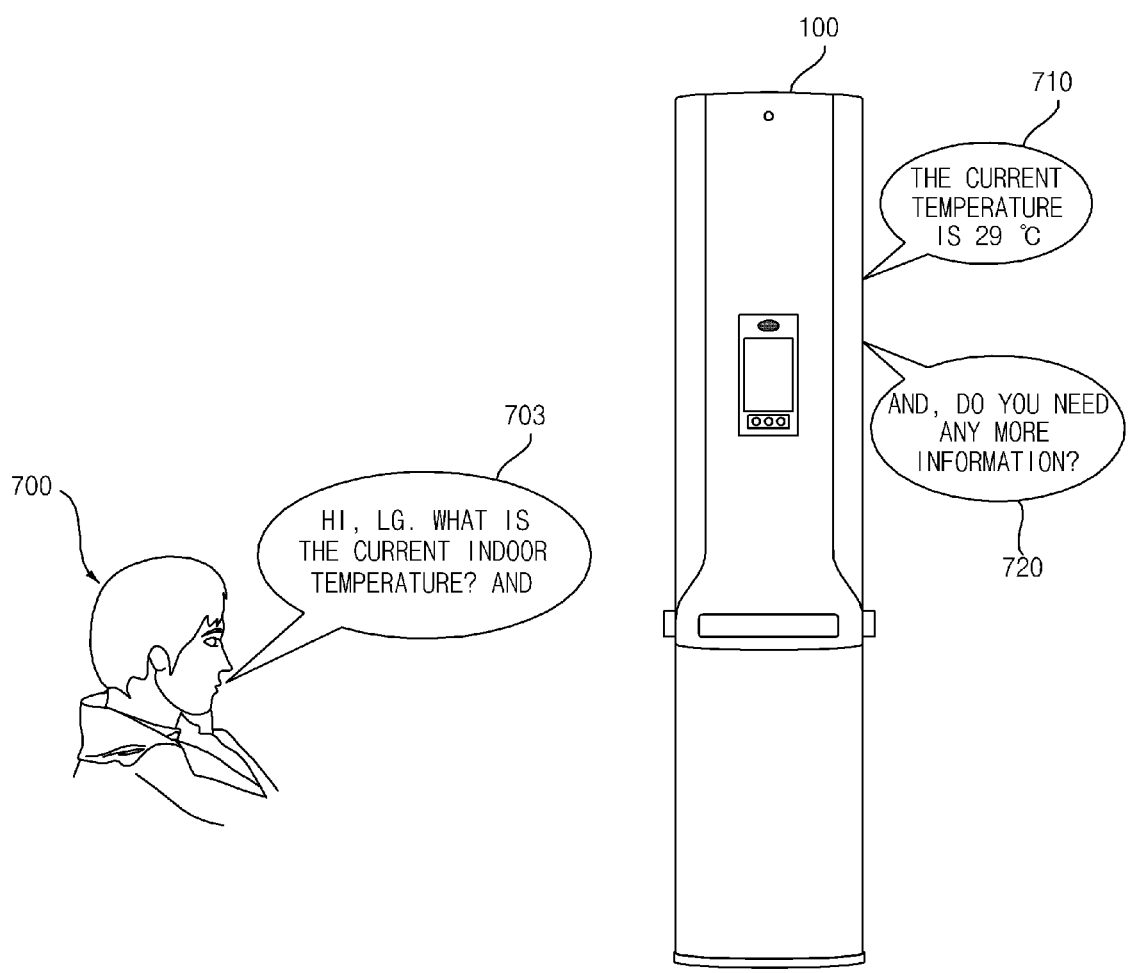

Further, referring to FIG. 7B, the user 700 may utter speech 703 including the predetermined wake-up word, "Hi, LG," and "what is the current indoor temperature? and" corresponding to a speech command.

In this case, in the speech corresponding to the speech command uttered by the user, "what is the current indoor temperature? and", the last part of the speech "and" is a conjunction corresponding to a predetermined word, such that the server 300 may transmit a response signal including a response to the speech, "what is the current indoor temperature?", and an additional query to the home appliance 100.

In addition, if there is no operation history of the home appliance 100, which is associated with the response to the current temperature, the server 300 may include a predetermined additional query, "do you need any more information?", in the response signal.

Further, the home appliance 100 may output the speech 710, corresponding to the response to the current temperature, and the speech 720 corresponding the predetermined additional query through the audio output unit 185. In this case, the home appliance 100 may output "and", which is the last part of the speech uttered by a user, between the response to the current temperature and the predetermined additional query.

Figure 7C:
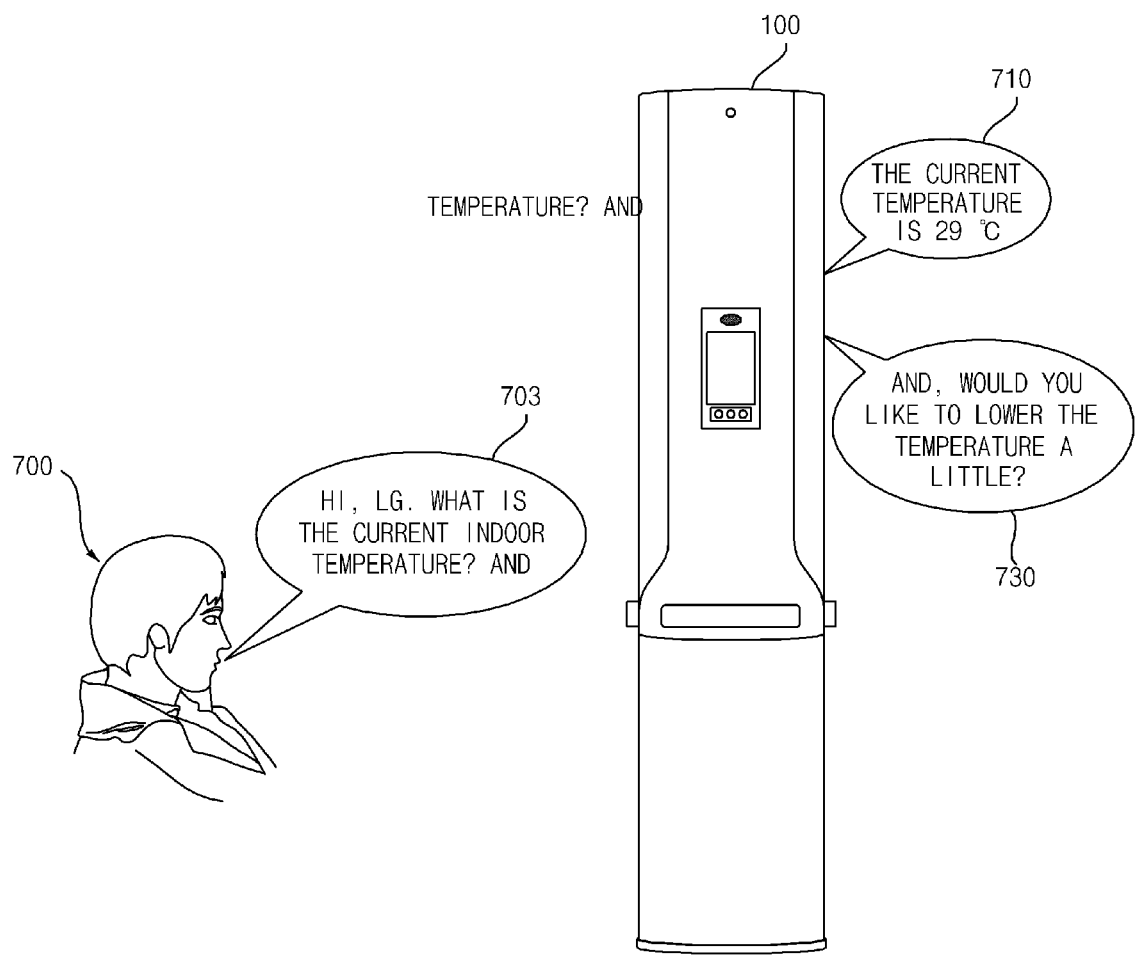

Referring to FIG. 7C, if there is an operation history of the home appliance 100, which is associated with the response to the current temperature, for example, if there is an operation history regarding an operation of decreasing the set temperature from the current temperature of 29° C., the server 300 may generate an additional query, "would you like to lower the temperature a little?", based on the operation history of the home appliance 100, and may include the generated additional query in the response signal.

In addition, the home appliance 100 may output the speech 710, corresponding to the response to the current temperature, and the speech 730 corresponding to the additional query through the audio output unit 185, and may output "and", which is the last part of the speech uttered by the user, between the response to the current temperature and the additional query.

Figure 8A:
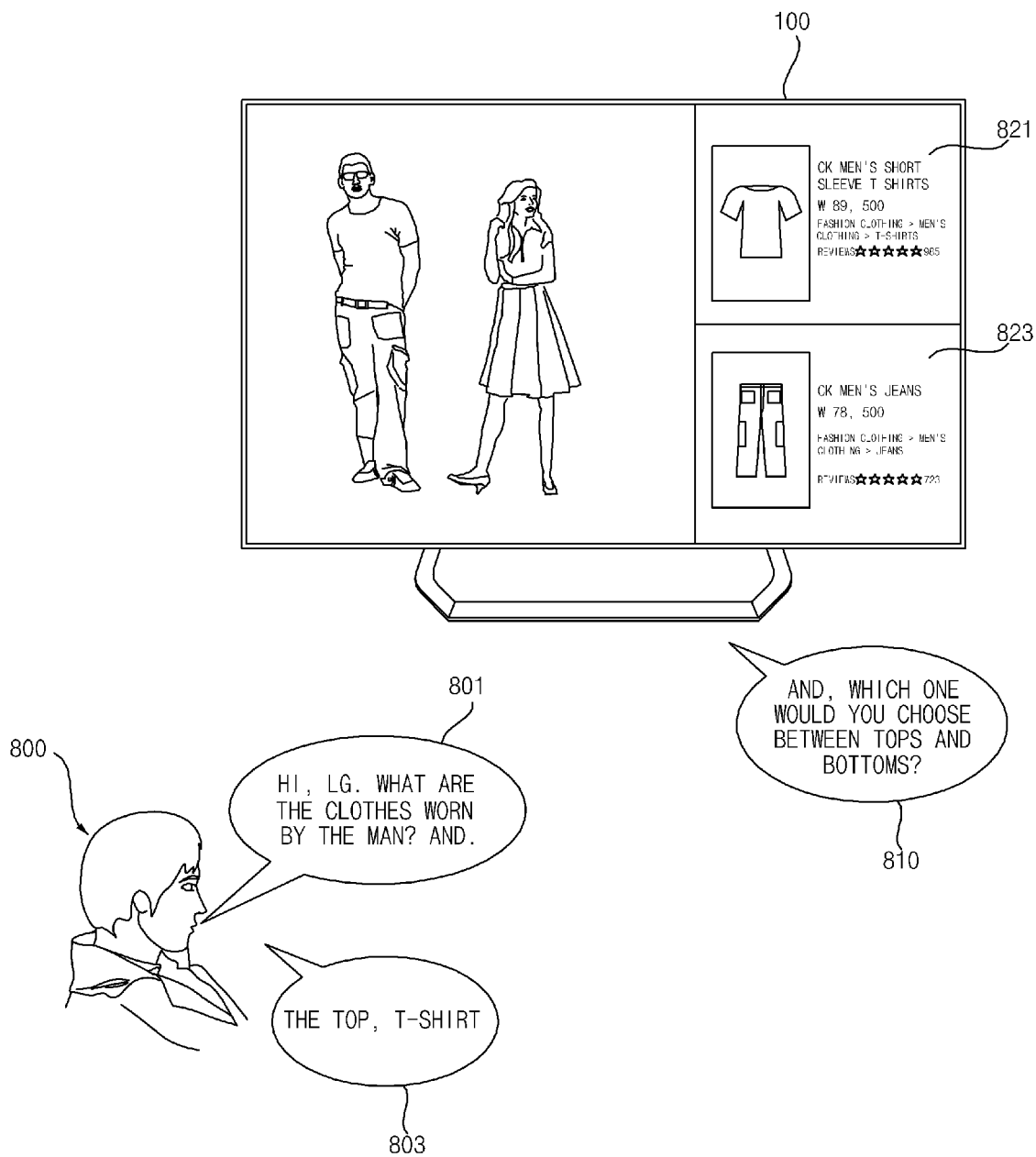

Referring to FIG. 8A, while the image display device as an example of the home appliance 100 outputs a screen for displaying content, the user 700 may utter speech 801, including a predetermined wake-up word, "Hi, LG", and "what are the clothes worn by the man? and", which corresponds to a speech command, toward the home appliance 100.

In this case, the home appliance 100 may activate the speech command receiving function according to the predetermined wake-up word, "Hi, LG", and may transmit data on "what are the clothes worn by the man? and", which corresponds to the speech command, to the server 300.

In addition, in the speech, "what are the clothes worn by the man? and", corresponding to the speech command uttered by the user, the last part of the speech, "and", is a conjunction corresponding to the predetermined word, such that the server 300 may transmit a response signal, including a search result for clothes as a response to "what are the clothes worn by the man?" and an additional query, to the home appliance 100.

In this case, if there is an operation history of the home appliance 100 which is associated with a search for clothes, for example, upon outputting a search result for clothes, if the server 300 receives a request for an additional search from the user or if there is an operation history regarding an operation of performing an additional search in response to the request, the server 300 may generate an additional query, "which one would you choose between tops and bottoms?", and may include the generated additional query in the response signal.

The home appliance 100 may output screens 821 and 823 displaying the search result for clothes on the display 180, and may output speech 810 corresponding to the additional query including "and", which is the last part of the speech uttered by the user, through the audio output unit 185.

In addition, upon outputting the speech 810 corresponding to the additional query, the home appliance 100 may activate the speech command receiving function, and the user may utter speech 803 including "the top, t-shirt" as a response to the additional query.

Figure 8B:
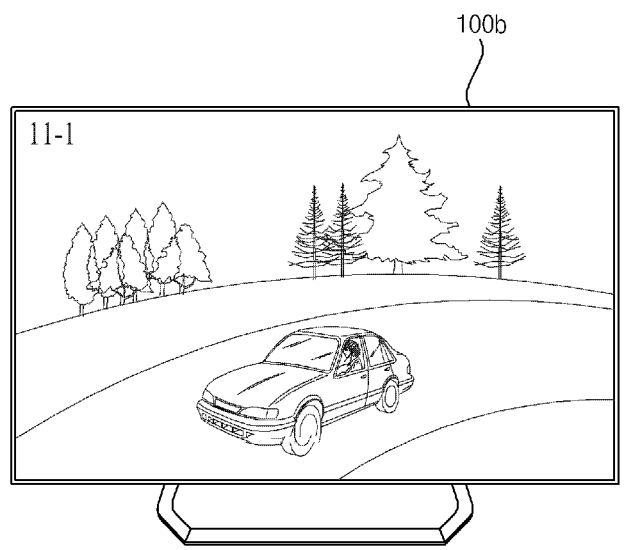
Figure 8B:
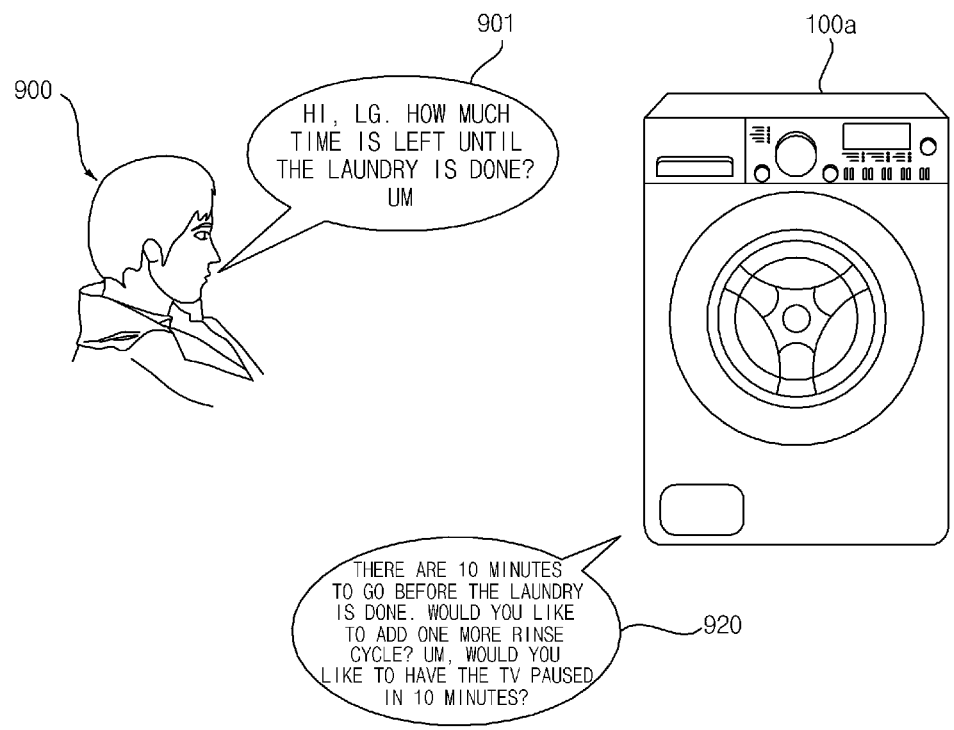

Further, referring to FIG. 8B, as the last part of the speech 803 further uttered by the user does not correspond to the predetermined word, the server 300 performs speech recognition of the speech 803 corresponding to the response to the additional query, and then may transmit a response signal, including only a search result for the top, t-shirt as a response to the speech 803, to the home appliance 100.

Moreover, as the response signal received from the server 300 does not include a control command for activating the speech command receiving function, the home appliance 100 outputs only a screen 821 for displaying the search result for the top>t-shirt, and then may be maintained in a standby state.

Figure 9A:
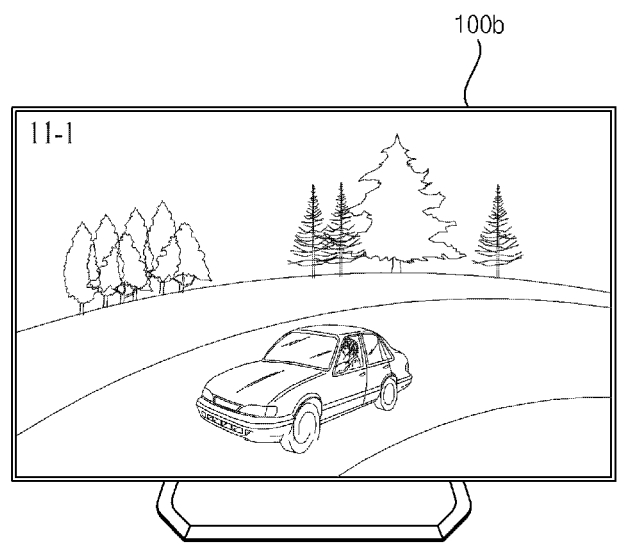
Figure 9A:
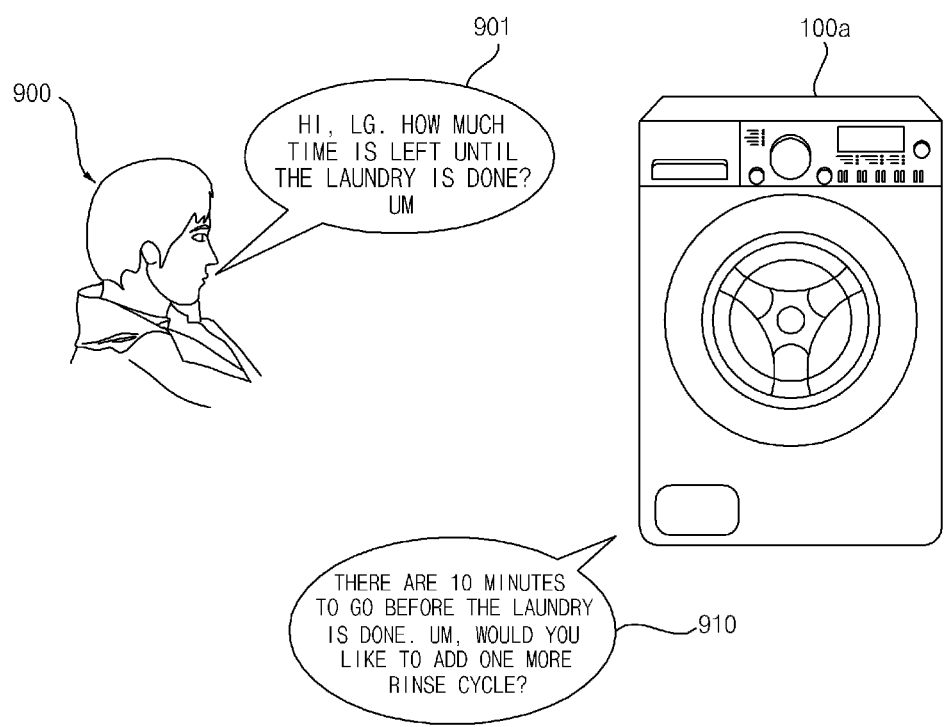

Referring to FIG. 9A, while a washing machine as an example of the home appliance 100 washes the clothes, the user 700 may utter speech 901, including the predetermined wake-up word, "Hi, LG", and "how much time is left until the laundry is done? um", toward the washing machine which is the first electronic device 100a.

In this case, the first electronic device 100a may activate the speech command receiving function in response to the predetermined wake-up word, "Hi, LG", and may transmit to the server 300 data on the speech, "how much time is left until the laundry is done? um", which corresponds to the speech command.

Further, in the speech, "how much time is left until the laundry is done? um", corresponding to the speech command uttered by the user, the last part of the speech, "um", corresponds to a predetermined filler word, such that the server 300 may transmit a response signal including a remaining time as a response to "how much time is left until the laundry is done?" and an additional query to the first electronic device 100a.

In this case, if there is an operation history of the first electronic device 100a which is associated with the remaining time, for example, if there is an operation history regarding an operation of adding a rinsing function after the remaining time has elapsed and the laundry is done, the server 300 may generate an additional query, "would you like to add one more rinse cycle?", based on the operation history of the first electronic device 100a and may include the generated additional query in the response signal.

In addition, the first electronic device 100a may output speech 910, including a response to the remaining time, "there are 10 minutes to go before the laundry is done", and the additional query, "would you like to add one more rinse cycle?", through the audio output unit 185 and may further output, "um", which is the last part of the speech uttered by the user, between the response to the remaining time and the additional query.

Figure 9B:
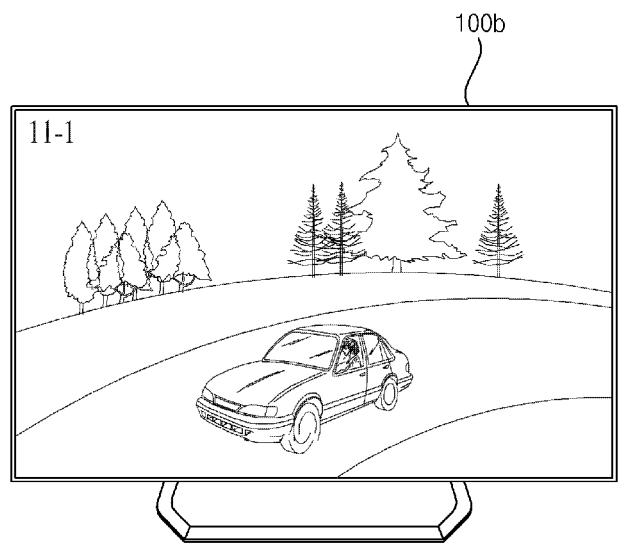
Figure 9B:
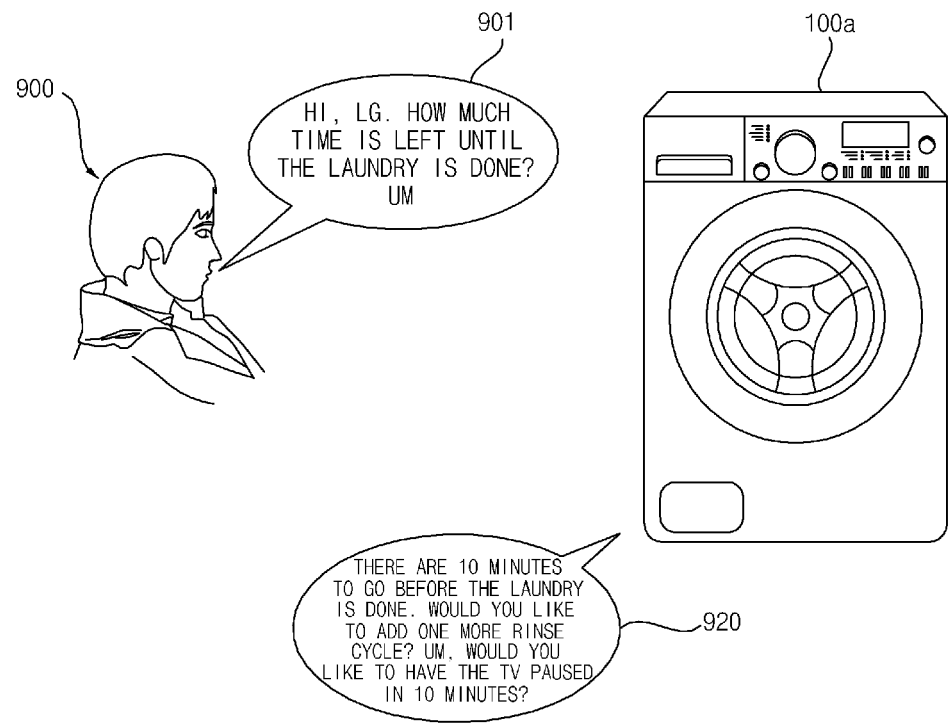

Further, referring to FIG. 9B, the server 300 may check an operating state of the second electronic device 100b, and may verify whether there is at least one second electronic device 100b being in an operating state related to the response to the remaining time. For example, in the operation history of the image display device as an example of the second electronic device 100b, if there is an operation history regarding an operation of pausing, by a user, playback of content output through the image display device after the laundry is done, the server 300 may generate an additional query, "would you like to have the TV paused in 10 minutes?", based on the operation history of the second electronic device 100b, and may include the generated additional query in the response signal.

In addition, the first electronic device 100a may output speech 920 including the response to the remaining time, "there are 10 minutes to go before the laundry is done", the additional query about the first electronic device 100a, "would you like to add one more rinse cycle?", and the additional query about the second electronic device 100b, "would you like to have the TV paused in 10 minutes?", through the audio output unit 185.

As described above, according to various embodiments of the present disclosure, after a response to the speech is provided, the speech command receiving function of the home appliance 100 may be reactivated automatically according to words included in the speech input from a user, such that the user may control the home appliance 100 in a simple and convenient manner without repetitive operations, such as voice wake-up and the like.

Furthermore, according to various embodiments of the present disclosure, not only the speech command receiving function of the home appliance 100 may be reactivated automatically, but also an additional query on the response may be provided for a user, thereby naturally inducing the user to make an additional utterance.

In addition, according to various embodiments of the present disclosure, an additional query, regarding an operation expected to be performed following a response, may be generated based on the operation history of the home appliances 100a and 100b, thereby providing a user with an additional query which is further relevant to a user's intention, usage pattern, surrounding environment, and the like.

The accompanying drawings are used to assist in easy understanding of various technical features and it should be understood that the embodiments presented herein are not limited by the accompanying drawings. As such, the present disclosure should be construed to extend to any alterations, equivalents and substitutes falling within the spirit and scope of the present disclosure.

Meanwhile, an operating method of the server and the system including the same according to the present disclosure can be realized as a processor-readable code written on a recording medium readable by a processor included in the server and the system including the same. The processor-readable recording medium may be any type of recording device in which data is stored in a processor-readable manner. Examples of the processor-readable recording medium include a ROM, a RAM, a CD-ROM, a magnetic tape, a floppy disc, an optical data storage, and a carrier wave, e.g., data transmission through the Internet. The processor-readable recording medium can be distributed over a plurality of computer systems connected to a network so that a processor-readable code is written thereto and executed therefrom in a decentralized manner.

While the present disclosure has been shown and described with reference to the preferred embodiments thereof, it should be understood that the present disclosure is not limited to the aforementioned specific embodiments, and various modifications and variations may be made by those skilled in the art without departing from the scope and spirit of the invention as defined by the appended claims, and the modified implementations should not be construed independently of the technical idea or prospect of the present disclosure.

What is claimed is:

1. A server, comprising:
a communicator configured to perform communication through a network;
a storage configured to store data on at least one predetermined word and data on an operation history of each of at least one electronic device; and
a controller configured to:
upon receiving an input signal, including data on speech, from a first electronic device through the communicator, determine whether a last part of the speech corresponds to any one of the at least one predetermined word;
in response to there being a word corresponding to the last part of the speech among the at least one predetermined word, transmit a first response signal, including data on a response to the speech and data on at least one additional query, to the first electronic device through the communicator; and
in response to there being no word corresponding to the last part of the speech among the at least one predetermined word, transmit a second response signal, including data on a response to the speech, to the first electronic device through the communicator,
wherein, in response to at least one first operation history associated with the response to the speech being present in the data on the operation history of the first electronic device, the controller is configured to generate a first additional query about the first electronic device based on the first operation history, and
wherein the first operation history corresponds to an operation performed in the first electronic device in relation to the response before the speech is input to the first electronic device.

2. The server of claim 1, wherein the at least one predetermined word comprises at least one of a conjunction, a filler word, and a predetermined command.

3. The server of claim 2, wherein the first response signal further comprises a control command for activating a speech command receiving function of the first electronic device.

4. The server of claim 1, wherein:
the storage further configured to data on an operation history of at least one second electronic device,
wherein the controller is configured to:
check an operating state of the at least one second electronic device; and
in response to there being at least one second electronic device, which is in an operating state associated with the response to the speech, among the at least one second electronic device, generate at least one second additional query about the second electronic device being in the operating state associated with the response to the speech.

5. The server of claim 4, wherein the at least one second electronic device is a device registered to a user's account, to which the first electronic device is registered.

6. The server of claim 5, wherein when generating neither the first additional query nor the second additional query, the controller is configured to include data on a predetermined additional query in the first response signal.

7. The server of claim 1, wherein the first response signal further comprises a control command for controlling the last part of the speech to be output between an output of the response to the speech and an output of any one of the at least one additional query.

8. The server of claim 7, wherein in response to an additional input signal not being received from the first electronic device within a predetermined period of time after the first response signal is transmitted to the first electronic device, the controller transmits a termination signal, including a predetermined termination message, to the first electronic device.

9. A system comprising at least one electronic device and a server including a storage configured to store data on at least one predetermined word and data on an operation history of each of the at least one electronic device,
wherein among the at least one electronic device, a first electronic device is configured to:
upon receiving speech, transmit an input signal including data on the speech to the server; and
upon receiving a response signal responsive to the input signal from the server, output speech according to the received response signal,
wherein the server is configured to:
upon receiving the input signal from the first electronic device, determine whether a last part of the speech included in the input signal corresponds to any one of the at least one predetermined word;

in response to there being a word corresponding to the last part of the speech among the at least one predetermined word, transmit a first response signal, including data on a response to the speech and data on at least one additional query, to the first electronic device; and in response to there being no word corresponding to the last part of the speech among the at least one predetermined word, transmit a second response signal, including data on a response to the speech, to the first electronic device, wherein, in response to at least one first operation history associated with the response to the speech being present in the data on the operation history of the first electronic device, the server is further configured to generate a first additional query about the first electronic device based on the first operation history, and wherein the first operation history corresponds to an operation performed in the first electronic device in relation to the response before the speech is input to the first electronic device.

10. The system of claim 9, wherein the at least one predetermined word comprises at least one of a conjunction, a filler word, and a predetermined command.

11. The system of claim 10, wherein the first response signal further comprises a control command for activating a speech command receiving function of the first electronic device.

12. The system of claim 9, wherein the server is configured to:

check an operating state of at least one second electronic device;

based on data on an operation history of the at least one second electronic device which is stored in a storage of the server, determine whether there is at least one second electronic device, which is in an operating state associated with the response to the speech, among the at least one second electronic device; and in response to there being the at least one second electronic device which is in the operating state associated with the response to the speech, generate at least one second additional query about the second electronic device being in the operating state associated with the response to the speech.

13. The system of claim 12, wherein the at least one second electronic device is a device registered to a user's account, to which the first electronic device is registered.

14. The system of claim 13, wherein the server is configured to include data on a predetermined additional query in the first response signal when generating neither the first additional query nor the second additional query.

15. The system of claim 9, wherein the first response signal further comprises a control command for controlling the last part of the speech to be output between an output of the response to the speech and an output of any one of the at least one additional query.

16. The system of claim 15, wherein the server is configured to transmit a termination signal, including a predetermined termination message, to the first electronic device in response to an additional input signal not being received from the first electronic device within a predetermined period of time after the first response signal is transmitted to the first electronic device.

* * * * *